United States Patent [19]

Ritter et al.

[11] 4,082,170

[45] Apr. 4, 1978

[54] FINAL DRIVE BLADDER

[75] Inventors: Arthur J. Ritter, Metamora; James R. Deck, Eureka, both of Ill.

[73] Assignee: Caterpillar Tractor Co., Peoria, Ill.

[21] Appl. No.: 768,120

[22] Filed: Feb. 14, 1977

[51] Int. Cl.² ................ B60K 41/24; B62D 55/12; F16D 67/02

[52] U.S. Cl. ................ 192/13 R; 74/607; 180/88; 180/DIG. 2; 301/128; 305/32

[58] Field of Search .......... 74/607; 180/9.44, 75, 180/88, DIG. 2; 192/13 R; 301/128; 305/32, 45, 60

[56] References Cited

U.S. PATENT DOCUMENTS

| | | | |
|---|---|---|---|
| 1,247,276 | 11/1917 | Hurlburt | 74/607 X |
| 2,074,319 | 3/1937 | Baker et al. | 192/13 R X |
| 2,681,231 | 6/1954 | Kondracki | 301/128 X |
| 3,025,716 | 3/1962 | Muller | 74/607 |
| 3,270,830 | 9/1966 | Barrett et al. | 301/128 X |
| 3,572,483 | 3/1971 | Giguere et al. | 192/13 R |

*Primary Examiner*—Roy Lake
*Assistant Examiner*—E. F. Desmond
*Attorney, Agent, or Firm*—Wegner, Stellman, McCord, Wiles & Wood

[57] ABSTRACT

In a housing, for instance, for a final drive assembly for a tractor, a large open space is created when the housing is enlarged, for instance, to accommodate a wider gauge set of tracks. The large open space is substantially filled with a bladder or other bulk member to prevent excess accumulation of oil, or the like, in the open space when the vehicle is tilted as when it is operating on a side slope.

9 Claims, 3 Drawing Figures

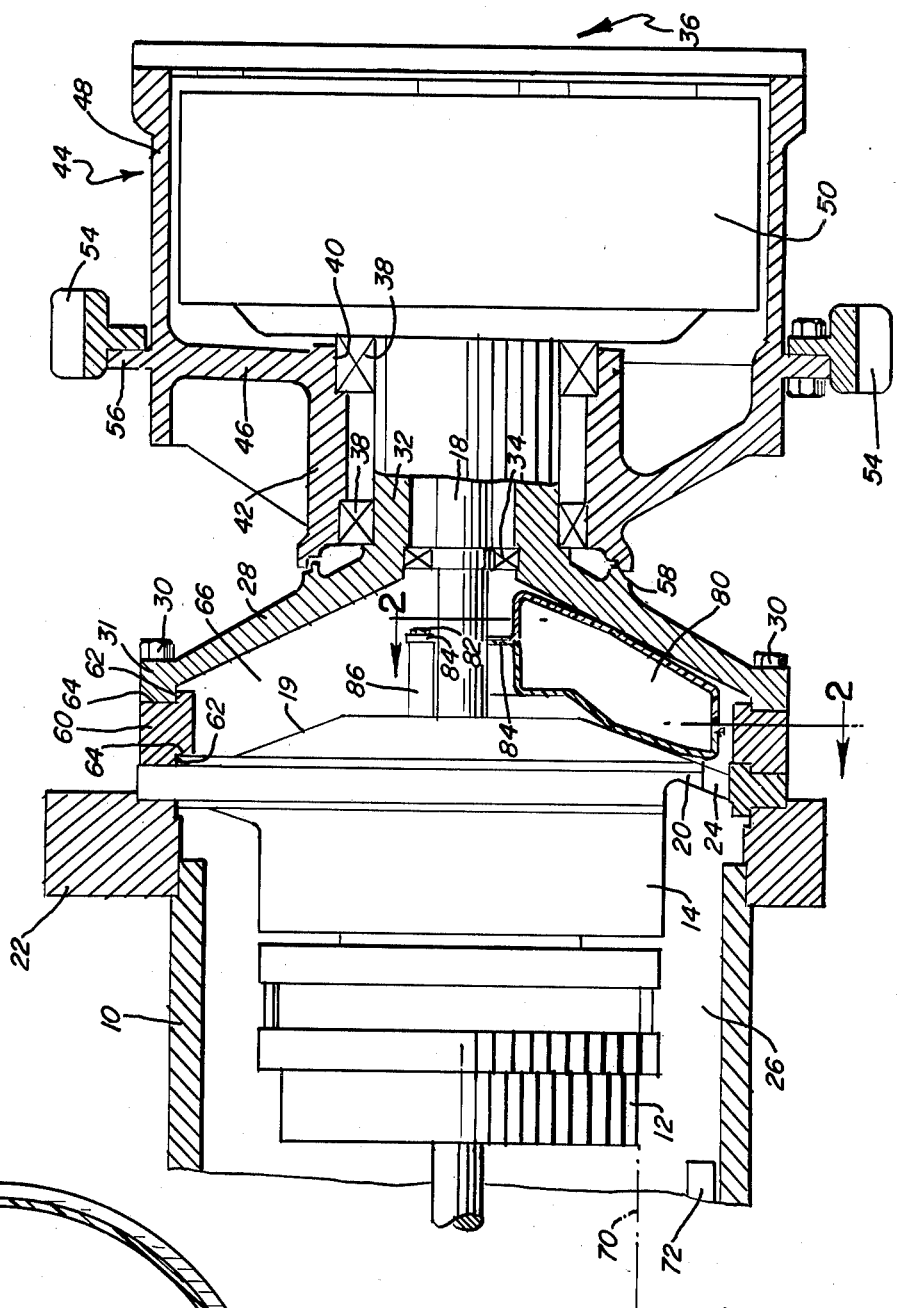
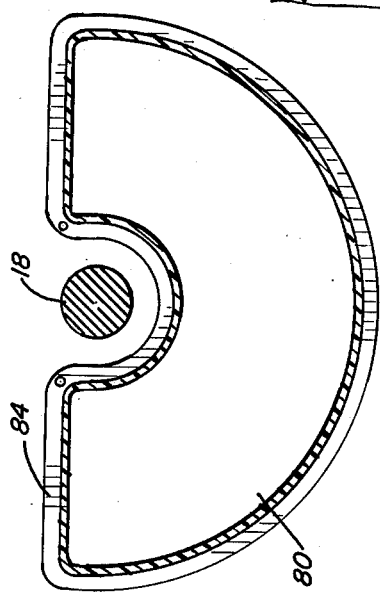
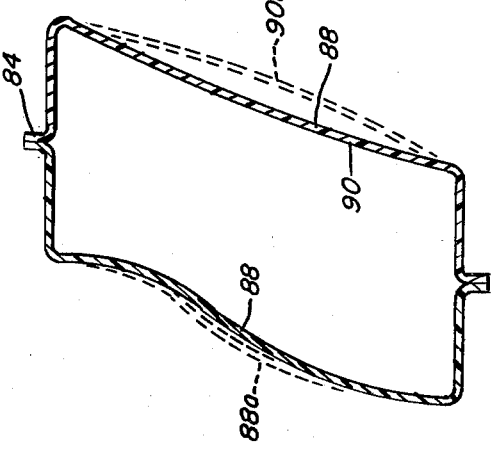

FINAL DRIVE BLADDER

BACKGROUND OF THE INVENTION

In drive housings of a vehicle it is sometimes desirable to elongate the housing so as to provide a wider spacing between the wheels or tracks of the vehicle. For instance, in the final drive assembly for a track-type vehicle, it is possible to want a wider gauge for the tracks. An insert is added in the housing so as to space the chain sprockets farther apart. After adding the insert, the interior of the drive housing has a large open space in which the lubricating oil for the steering and braking drives is free to circulate. Under certain conditions, for instance, when the vehicle is tilted, such as when it is operating on a side slope, the oil drains from the rest of the housing into the open space. Under the tilted condition, the scavenge pump in the drive housing is starved of oil thereby preventing adequate lubrication of the parts in the housing with the resulting possible overheating, failures and other problems.

SUMMARY OF THE INVENTION

The present invention is directed to overcoming one or more of the problems as set forth above.

According to the present invention, a bladder, or other bulk member, is resiliently seated in the open space created in a lubricated drive housing when it is necessary to elongate said housing to accommodate some particular feature. The bladder or bulk member may be molded in two halves of fiber glass, rubber, neoprene, or the like, with the halves being assembled together and secured in said open space. The bladder, or bulk member, prevents excessive amounts of oil from accumulating on one side of the housing thereby maintaining an adequate level of oil around the scavenge pump.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a vertical sectional view of a drive housing with an enlarging insert in position and having our improved bladder or bulk member in position therein;

FIG. 2 is a cross-sectional view taken along the lines 2—2 of FIG. 1; and

FIG. 3 is a slightly enlarged cross-sectional view taken on the line 3—3 of FIG. 2 showing only the bladder.

DESCRIPTION OF THE PREFERRED EMBODIMENT

A vehicle, such as a tractor-type vehicle, has a housing 10 encasing a steering clutch 12 and steering brake 14 which are mounted in tandem on a shaft 18. The steering brake 14 has a cover 19 with a radially extending perforated flange 20 which is secured to the bracket 22 and to the housing 10 encasing said steering brake. The perforations comprise openings 24 extending transversely through the radial flange 20 to permit communication of lubricating oil, or fluid, from within the cavity 26 of the housing 10 and an open area surrounding the shaft 18 axially outward from the steering brake 14. A bell-shaped end cap 28 is bolted by means of bolts 30 passing through a rim 31 on the end cap 28 into the end of the housing 10 and has an integrally formed axially extending sleeve 32 centrally disposed thereon, which sleeve 32 encircles the outer end of the shaft 18. The shaft 18 is mounted in bearings 34 in the sleeve 32 of the end cap 28 so as to permit rotation of the shaft 18 relative to the housing 10.

A final drive assembly 36 is rotatably driven by the shaft 18 and is rotatably mounted on the sleeve 32 of the housing 10 by means of spaced apart bearings 38 surrounding the sleeve 32. The bearings 38 are seated in radial recesses 40 formed inside a hollow tube 42 of a hub 44. The hub 44 has a radial flange 46 and a cylindrical casing 48 which surrounds and encloses a final drive 50. A cap 52 is secured over the end of the casing 48 to seal the final drive 50 therein. A chain sprocket 54 is secured to a radial shoulder 56 formed on the cylindrical case 48. A seal 58 is provided between the tube 42 of the hub 44 and the end cap 28 of the housing 10 so as to prevent lubricant from escaping from within the case 48. The final drive 50 is operatively connected to the steering brake 14 and steering clutch 12 through the shaft 18 and functions in the normal manner.

In certain types of equipment, it is desirable to have either narrow gauge or wide gauge track settings. The final drive 50 is normally designed for what could be considered as a narrow gauge setting of the chain sprocket 54 whereupon the outer rim 31 of the end cap 28 would be bolted directly through the flange 20 on the steering brake 14 to the bracket 22 of the housing 10. For a wide gauge track, wherein the chain sprockets 54 are spaced farther apart than normal, a cylindrical spacer 60 is inserted between the rim 31 of the end cap 28 and the flange 20 on the steering brake 14 and is bolted to the housing 10 by means of a plurality of bolts 30 passing through said rim 31 and spacer 60. The shaft 18 is elongated appropriately so as to accommodate for the increased distance from the steering brake 14 to the final drive 50. The insert 60 has offset shoulders 62 which seat against mating shoulders 64 on the rim 31 and flange 20 so as to form a sealed connection therebetween. When the chain sprockets 54 have been spaced farther apart, as is illustrated in FIG. 1 by means of the spacer 60, a relatively large open space 66 is provided between the end cap 28 and the cover 19 of the steering brake 14. In normal use, a certain level of lubricating oil, such as shown by the dashed line 70 in FIG. 1, is maintained in the cavity 26 of the housing 10 containing the steering clutch 12 and the steering brake 14. A scavenge pump 72 is shown schematically positioned in the cavity 26 of the housing 10 with an inlet at the low point of the housing 10 so as to draw up the lubricating oil and circulate it through the appropriate parts, such as through the steering clutch 12 and steering brake 14 assembly. It has been found that under these conditions, with the end cap 28 spaced from the steering brake cover 19, there are positions of the vehicle when a substantial portion of the lubricating oil will accumulate in the open space 66 between the end cap 28 and the cover 19 of the steering brake 14 with virtually no lubricating oil in the vicinity of the intake of the scavenge pump 72 so that the scavenge pump 72 is starved for lubricating oil which, in turn, will starve the moving parts resulting in overheating, malfunction and/or failure of the unlubricated moving parts. This condition is particularly prevalent when the vehicle is operating on a side slope. The steeper the slope, the more pronounced the problem so that with the one track elevated with respect to the other track, the lubricating oil in the cavity 26 of the housing 10 will run through openings 24 in flange 20 to the low point and will accumulate in the open space 66 between the end cap 28 and the cover 19 of the steering brake 14. It has been found that the problem cannot be solved by just adding additional oil to the cavity 26, since the increased amount of oil reduces the horsepower output of the unit, thereby defeating the very purpose of the drive.

A bladder, or other bulk member 80, is installed in the open space 66 between the end cap 28 and the cover 19 of the steering brake 14 and is secured therein by means of bolts 82 passing through a rib or projection 84 on the bladder 80, which bolts 82 pass through spacers 86 prior to being threaded into the cover 19 of the steering brake 14. In this way, the bladder 80 is secured against rotation within the open space 66 in the housing 10. As can best be seen in FIGS. 2 and 3, the bladder 80 may be a molded member being formed in two parts 88,90 of appropriate materials, such as fiber glass, neoprene, rubber, or the like. The two halves 88,90 are welded or cemented together along the mating ribs 84 formed around the open faces of each half 88,90 so as to form the bladder 80. As illustrated in FIG. 3, it is to be noted that a dotted line position 88a and 90a of the two halves 88,90 of the bladder 80 extend outwardly from the solid line sides 88,90 of the bladder 80. In other words, prior to assembly of the bladder 80 in the open space 66, the sides are extended to the dotted line positions 88a and 90a. Thereafter, when the bladder 80 is positioned in the open space 66 by means of bolts 82 and spacers 86 and the bolts 30 are drawn up tight against the end cap 28 and spacer 60, the opposite sides 88a and 90a of the bladder 80 will be compressed to the solid line position 88,90 whereby the bladder 80 is resiliently positioned in said open space 66. The resilient impression of the front and rear walls, 88,90, of the bladder 80 will combine with the bolts 82 and spacers 86 to position the bladder 80 in the open space 66 to assure that the bladder 80 will not move relative to the end cap 28 and the housing 10. Since the bladder 80 is sealed, it will serve as a space occupying member so as to force the lubricating oil in the housing 10 to maintain a proper level with respect to the scavenging pump 72. In this way, the optimum amount of lubricating oil can be maintained in the cavity 26 without the deleterious effects resulting from all of said lubricating oil draining to the open space 66 between the extended end cap 28 and the steering brake 14.

When it is desired to convert the gauge of the vehicle to a normal gauge, the end cap 28 is removed from the housing 10 and the spacer 60 is removed along with the bladder 80. The end cap 28 can then be secured back against the housing 10 for use. With the chain sprocket 54 in the normal position, there will be relatively little space between the end cap 28 and the steering brake 14 so that the need for a bladder 80, or other bulk member, is eliminated.

It is contemplated that in any application where it is desired to operate a system using a minimum amount of lubricating oil and still eliminate the starving affect caused by the oil draining into excess open spaces 66 in the housing 10, a bladder 80, or bulk member, can be provided so as to maintain the proper level of the lubricating oil using the proper amount of lubricating oil.

The embodiments of the invention in which an exclusive property or privilege is claimed are defined as follows:

1. A final drive assembly having a housing with a cavity therein, a perforated flange supporting a cover across one end of said cavity, an end cap and a spacer bolted to the end of said housing to define a relatively large volumn open space between said end cap and said cover, said open space communicating into the cavity through the perforated flange, and means positioned in said open space to occupy a substantial portion of said open space so as to prevent excessive amounts of fluid from collecting in said open space.

2. In a final drive assembly as claimed in claim 1 wherein said means comprises a bladder.

3. In a final drive assembly as claimed in claim 2 wherein said bladder is resiliently compressed between said cover and said end cap.

4. In a final drive assembly as claimed in claim 2 wherein said bladder is made in two parts of fiber glass material, said two parts being sealed together to form a closed chamber therein.

5. In a final drive assembly as claimed in claim 3 wherein fastening means secure said bladder in the lower part of said open space.

6. In a steering clutch and brake housing, a steering clutch, a steering brake, a shaft extending from said steering clutch and steering brake into driving connection with a final drive, a hub, a chain sprocket carried by said hub, an end cap bolted through a spacer to the end of said clutch and brake housing to define a relatively large volumn open space therein, said open space communicating into the cavity in the housing containing the steering clutch and steering brake, a scavenge pump in said housing for pumping lubricating oil from said cavity into said steering clutch and steering brake for lubricating and cooling same, in combination means positioned in said open space to occupy a substantial portion of said open space so as to prevent excessive amounts of oil from collecting in said open space.

7. In a steering clutch and brake housing as claimed in claim 6 wherein said means comprises a bladder.

8. In a steering clutch and brake housing as claimed in claim 7 wherein said bladder is resiliently compressed into said open space and is further held therein by fastening means.

9. In a steering clutch and brake housing as claimed in claim 7 wherein said bladder is a molded fiber glass material.

* * * * *